Aug. 1, 1944.  W. H. SILVER  2,354,886
LISTER
Filed Jan. 20, 1940   5 Sheets-Sheet 1
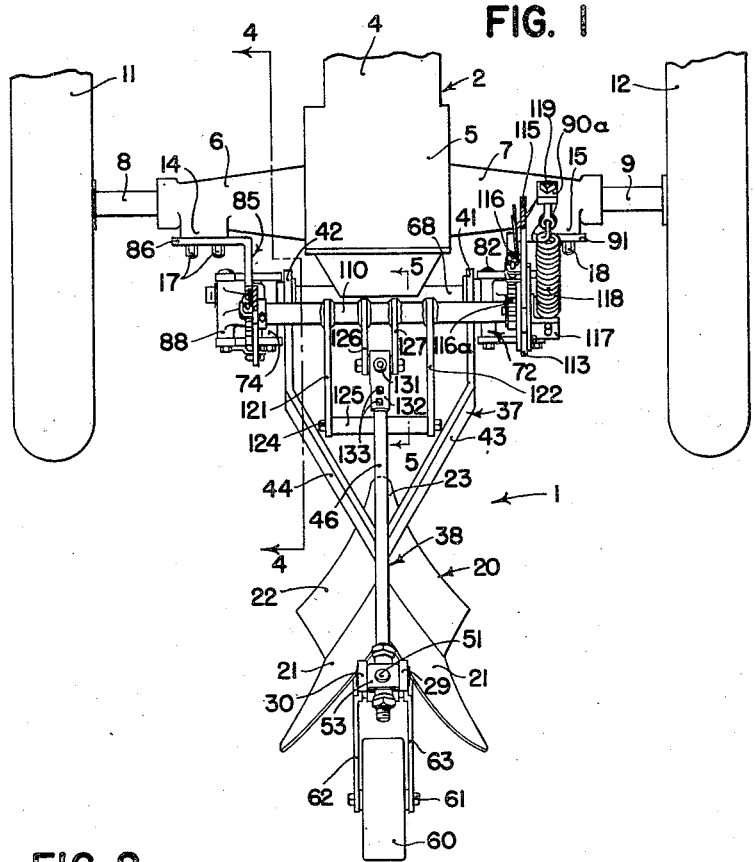
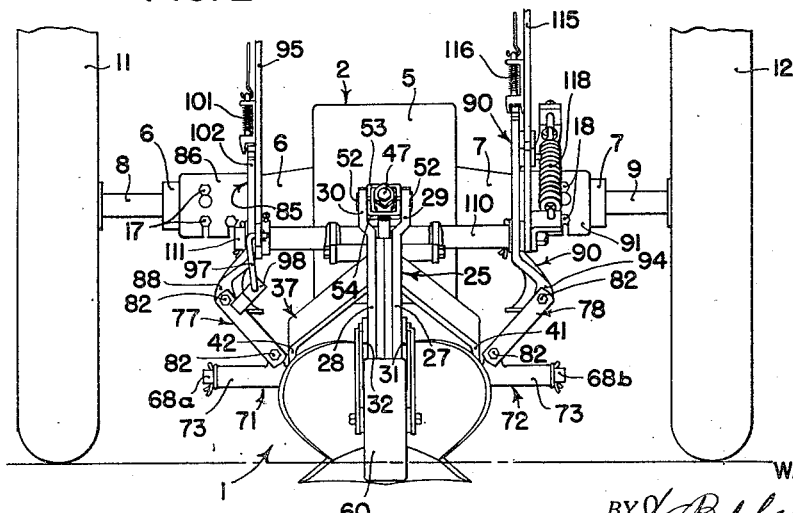
INVENTOR:
WALTER H. SILVER.
BY
ATTORNEYS.

Aug. 1, 1944.  W. H. SILVER  2,354,886
LISTER
Filed Jan. 20, 1940  5 Sheets-Sheet 2

*INVENTOR:*
WALTER H. SILVER.
BY
*ATTORNEYS.*

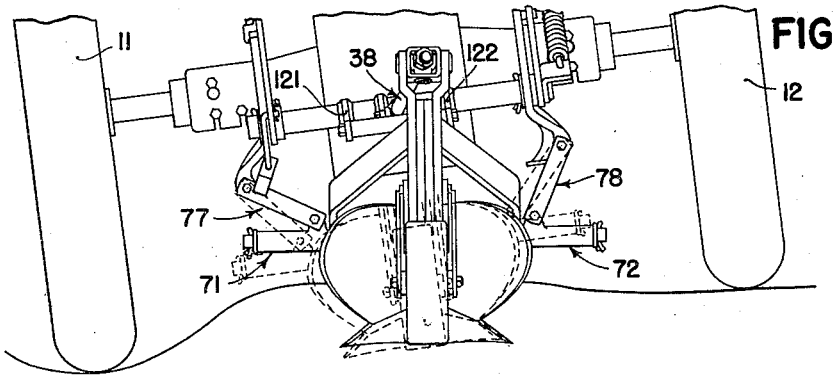
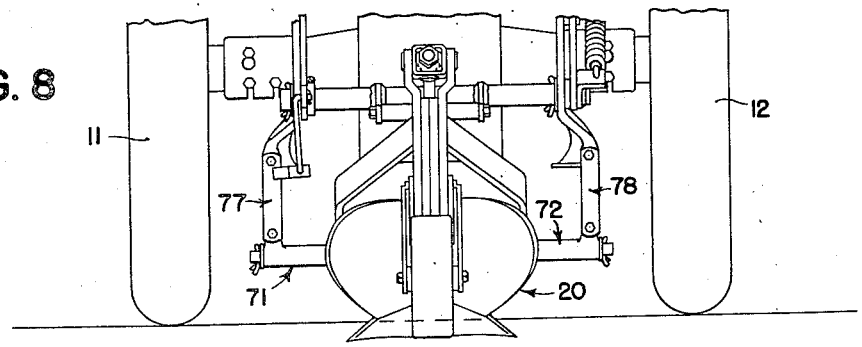
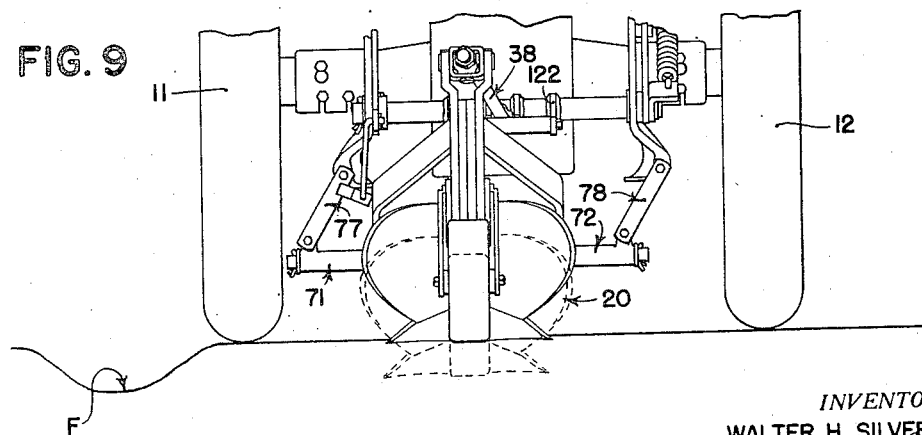

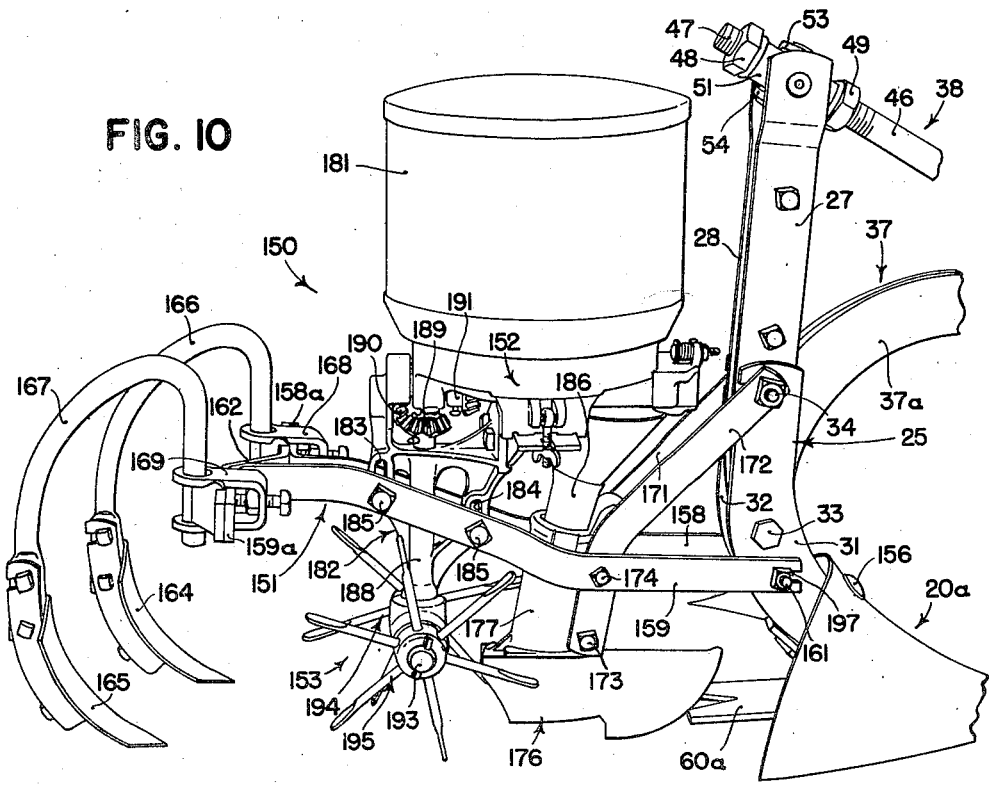

Aug. 1, 1944. W. H. SILVER 2,354,886
LISTER
Filed Jan. 20, 1940 5 Sheets-Sheet 5

INVENTOR:
WALTER H. SILVER
BY
ATTORNEYS.

Patented Aug. 1, 1944

2,354,886

UNITED STATES PATENT OFFICE 2,354,886

LISTER

Walter H. Silver, Moline, Ill., assignor to Deere & Company, Moline, Ill., a corporation of Illinois Application January 20, 1940, Serial No. 314,821

27 Claims. (Cl. 111—63)

The present invention relates generally to agricultural machines and is more particularly concerned with implements of the integral or tractor-mounted type.

The object and general nature of the present invention is the provision of new and improved connections between a tool means and the tractor or other supporting means propelling it, wherein a single adjusting lever or other part is adapted to secure the desired depth adjustment and, in addition, to lift the tool means into its transport position. A further feature of this invention is the provision of connections between the tool means and the tractor whereby the tool means in normal operation is capable of swinging vertically relative to the tractor so as to follow irregularities of the ground surface and to secure a uniform depth of operation irrespective of up and down movement of the tractor. It is to be understood that by the term "tool means" I contemplate a plow, furrow opener, or other ground working tool, either with or without auxiliary means, such as a planting unit, gauge wheel, rolling coulter, or the like.

More specifically, it is a feature of this invention to connect the tool means, such as a plow bottom, with the tractor by means serving as a pair of generally parallel vertically spaced longitudinally extending links, one of which may be in the form of a beam to which the tool means is pivoted and whose pivotal movement is controlled by the movement of one of the links relative to the other. It is also a feature of this invention to provide means operative through one range of movement to act through one link to adjust the operating depth and operative through another range of movement to act through one of the links for bodily raising the tool means into its transport position. Still further, an additional feature of this invention in this connection is the provision of laterally swinging links or the like operatively connecting the forward end of the beam with the tractor and the depth adjusting and lifting connections arranged to accommodate the lateral movement of the tool means relative to the tractor. It is also a feature of this invention to provide means for swinging the aforesaid links laterally so as to position the tool means in the desired lateral position.

Another important feature of the present invention is the provision of means making it possible to dispose the laterally swingable links either in convergent relation or in substantially parallel relation. When arranged in convergent relation, the links and associated parts are such that, in effect, where the tool means includes a plow bottom, the latter moves laterally relative to the tractor about an axis which substantially coincides with the point of the bottom, whereby any lateral tilting of the tractor, as when one wheel operates in a furrow and the other wheel on the land, will not affect the quality of the work done.

In this connection it is a further and important feature of this invention to provide an arrangement whereby a lister bottom is mounted so that it is movable bodily laterally, whereby the lister bottom may be operated fairly close to the furrowward wheel so as to form a new furrow closely adjacent the previously formed furrow, that is, with relatively narrow spacing, yet it is not necessary to have the furrowward wheel of the tractor operate too close to the previously formed furrow with consequent tendency to break down the landward furrow wall. Then, when the outfit is turned around and the next furrow is formed, the lister bottom may be shifted laterally to the opposite side of the tractor, with the same results, namely, a narrow furrow spacing without the requirement that the tread of the tractor have a corresponding narrow spacing. A further feature of this invention is the provision of an integral or tractor-mounted lister unit so arranged that the tractor may be operated with both rear wheels on the unplowed land. This means that the tractor can be operated in a level position, a very important advantage when performing both operations of opening a furrow and depositing seed at the same time.

Another important feature of this invention is the provision of a listing unit in which the lister bottom is pivoted to a plow beam by means of a standard to which the bottom is preferably fixed rigidly, and in which another operating part, such as a gauge wheel, a planting unit or planting unit runner, a coulter, or some other operating part or mechanism, is fixed so as to be disposed in the proper adjusted position when the plow bottom is adjusted for the desired operating depth. In this connection it is a feature of the present invention to provide a coulter or some other operating part or mechanism fixed to the standard and extending forwardly, in connection with a tool beam having parts so formed as to accommodate the position of said part.

Still further, another feature of this invention is the provision of a listing implement which includes a lister bottom and standard rigidly fixed thereto, connected to a tractor or other supporting means by a pair of links vertically spaced, with the lower link curved so as to provide, in effect, a plow beam having ample clearance above the moldboard.

These and other objects and advantages of the present invention will be apparent from the following description of the preferred structure in which the principles of the present invention have been incorporated, illustrated in the accompanying drawings.

In the drawings:

Figure 1 is a top or plan view of an agricultural implement in which the principles of the present invention have been embodied, the forward portion of the tractor being omitted for purposes of clarity;

Figure 2 is a rear view of the implement shown in Figure 1;

Figure 7 is a rear view, similar to Figure 2, but showing the action of the laterally swinging links which connect the forward end of the lister beam in draft transmitting relation with the tractor, wherein the latter is tipped, as when one wheel runs in a furrow;

Figure 8 is a view, similar to Figures 2 and 7, but with the draft transmitting links arranged in parallelism, as may be desirable when the tread of the tractor is narrowed to facilitate forming furrows spaced close together.

Figure 9 is a view similar to Figure 8 but showing the lister bottom displaced toward the left rear wheel;

Figure 10 illustrates the attachment of a planting unit to the lister bottom and standard;

Figure 11 is a view similar to Figure 10 but showing a modified arrangement of a planting mechanism, and also a modified link connection between the lister bottom with its standard and the tractor or other supporting means;

Figure 3:
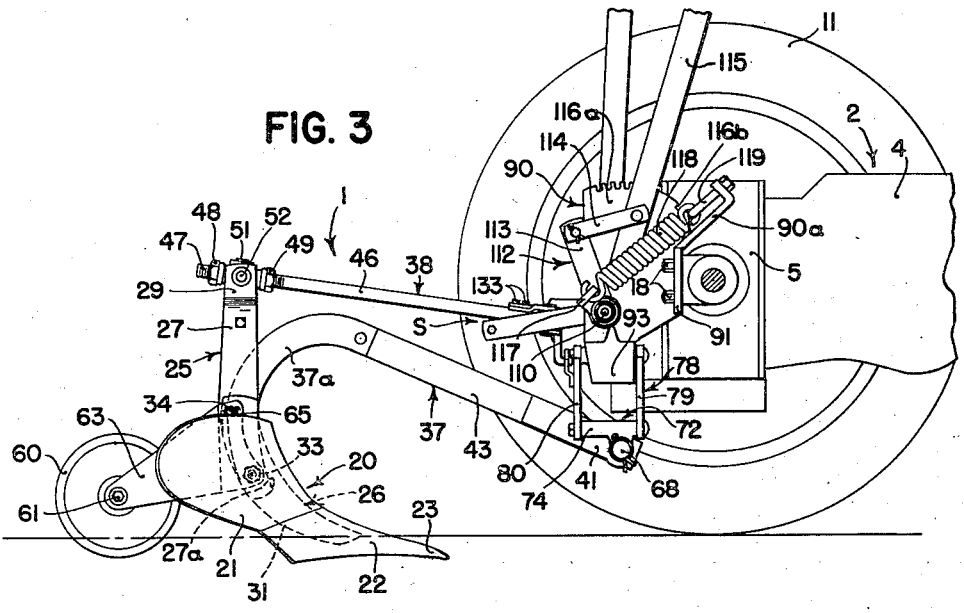
Figure 3 is a side view of the implement shown in Figure 1, the near rear wheel being removed to show the implement construction more clearly.

Referring now to the drawings, more particularly to Figures 1 to 6, inclusive, the implement is indicated in its entirety by the reference numeral 1 and the supporting frame means, preferably in the form of a tractor, is indicated by the reference numeral 2. The tractor 2 is of the usual type, embodying a transmission housing 4 which forms the frame of the tractor and a rear axle housing 5 having lateral extensions or quills 6 and 7. The latter receive, respectively, axle shafts 8 and 9 upon which left and right hand rear traction wheels 11 and 12 are mounted, usually for lateral adjustment so as to vary the tread. Each of the quills 6 and 7 is provided with attachment bosses 14 and 15, with attaching studs 17 and 18 by which various implements may be attached to the tractor, forming an integral outfit.

The implement 1 with which the present invention is more directly concerned, is illustrated as a lister plow or middlebreaker. The lister bottom 20 is of the usual construction for a furrow opener of this type, embodying two moldboards 21, one for turning the soil to the right and the other for turning it to the left, with a double wing share 22 to accommodate the right and left hand moldboards, the point of the share 22 being indicated at 23. The bottom or furrow opener 20 is fixed in any suitable manner to the lower curved end of a standard 25, the lower end to which the bottom 20 is fixed being indicated at 26. As best shown in Figures 1 and 2, the standard 25 consists of right and left hand members 27 and 28, the upper end of each being offset laterally outwardly, as indicated at 29 and 30 in Figure 2, for a purpose which will be explained below. The lower portion of the standard 25 comprises a pair of right and left hand standard sections or trip plates 31 and 32 which are pivoted, as at 33 (Figure 3), to the lower ends 27a of the upper standard sections 27 and 28. A bolt 34 (Figure 3) passes through the upper end of the lower standard section 31 and the adjacent portion at the lower end of the upper standard section 27. A similar bolt passes through the upper end of the lower standard section 32 and the adjacent section 28. These bolts thus serve as means for frictionally holding the lower sections 31 and 32 of the standard and the plow bottom 20 in operating position.

The plow bottom 20 and its standard 25 to which it is fixed are connected with the tractor 2 by a pair of semi-parallel link members 37 and 38. The member 37 is, in effect, a plow beam which is curved, as at 37a, at its rear end and consists of two right and left hand members 43 and 44 which are secured together in any suitable manner, terminating forwardly in generally parallel spaced apart sections 41 and 42 forming the forward ends of the members 43 and 44. As best shown in Figures 1 and 2, the members 43 and 44 diverge forwardly. The lower end of the curved section 37a is apertured to receive the pivot bolt 33, the latter thus forming the means for pivotally connecting the plow bottom 20 and its standard 25 to the lower link member 37. The forward end of the plow beam 37 is connected in draft transmitting relation with the tractor 2 by hitch means which will be described below. The upper link member 38 consists of a rod 46, the rear end of which is threaded, as at 47 (Figure 3), to receive a pair of nuts 48 and 49 which are disposed on opposite sides of a trunnion member 51 through which the threaded end 47 of the rod 46 is slidable and which is pivoted, as at 52, between the upper offset standard sections 29 and 30 (Figure 2). As best shown in Figures 1 and 2, the trunnion 51 is disposed for lateral rocking movement between a pair of upper and lower swivels 53 and 54, the ends of which are constructed to form the pivots 52.

A gauge wheel 60 is journaled on an axle 61 carried by a pair of brackets 62 and 63. Each of the brackets is apertured to receive the pivot bolt 33, as best shown in Figure 3, and above the pivot bolt 33 each bracket is provided with one or more slots 65 through which the bolt 34 passes. When the latter is tightened, the brackets 62 and 63 are firmly fixed to the standard 25 so as to move bodily with the plow bottom 20 when the standard is pivoted relative to the plow beam 37. As will be explained below, the gauge wheel 60 is representative of any operating part or mechanism that may be fixed to the standard 25. Other parts or mechanisms that may be attached to the standard 25 are referred to below.

Figure 4:
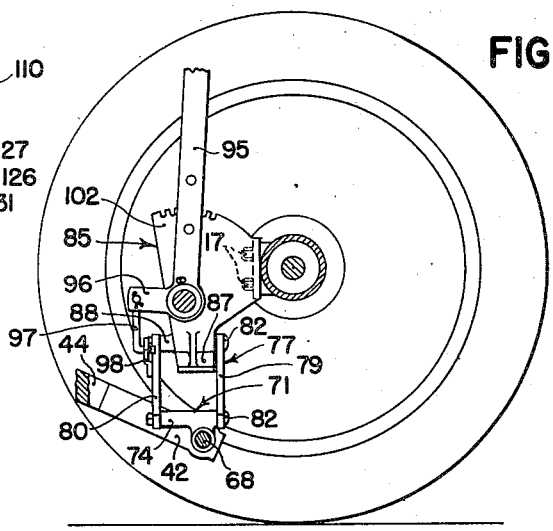
Figure 4 is a sectional view taken substantially along the line 4—4 of Figure 1.

As mentioned above, the forward end of the plow beam or link member 37 is formed with divergent portions 43 and 44 (Figure 1). The forward ends 41 and 42 of the parts 43 and 44 are fixed, as by welding or the like, to a cross shaft 68, the ends of which extend laterally outwardly beyond the beam sections 41 and 42, as indicated at 68a and 68b in Figure 2. The ends of the cross shaft 68 are received, respectively, in a pair of leveling pivots 71 and 72. Each of these members includes a pair of sleeves 73 and 74 (Figures 2 and 4) which are disposed substantially at right angles. The sleeves 73 are arranged transversely and receive the ends of the cross shaft 68, whereby the leveling pivots 71 and 72 are arranged for rocking movement on the shaft 68. This disposes the other sleeve section 74 of each of the leveling pivots in a longitudinal direction, as shown in Figures 3 and 4. A pair of leveling links 77 and 78 are pivotally connected at their lower ends to the leveling pivots 71 and 72. Each of the leveling links 77 and 78, as best shown in Figure 4, comprises front and rear strap members 79 and 80 connected together by upper and lower pivots in the form of bolts 82 (Figure 2). Preferably, the pivot bolts are rigidly secured, as by riveting, welding or any other means, to one of the leveling link straps, the other strap of each link being removable to permit assembly. The lower bolts 82 of the leveling links are disposed in the sleeve sections 74 of the leveling pivots 71 and 72. The upper ends of the leveling links 77 and 78 are pivotally connected with the tractor through means which forms a part of the mechanism adjustably connecting the forward end of the upper link member 38 with the tractor, which means will now be described.

A bracket 85 (Figure 4) is provided with a flange section 86 which is apertured to receive the attaching studs 17 (Figure 1). The bracket 85 includes a lower extension 87 (Figure 4) which is formed with a sleeve 88 through which the upper pivot bolt 82 of the left-hand leveling link 77 is disposed. A similar bracket 90 (Figure 3) is provided with an apertured flange 91 by which the right-hand attaching studs 18 secure the bracket 90 to the right-hand quill 7. The bracket 90 also includes a lower extension 93 which has a sleeve section 94 (Figure 2) through which the upper bolt 82 of the right-hand leveling link 78 is disposed. These pivot bolts 82 form hinged connections, the axes of which extend generally longitudinally and restrain relative movement between the parts thus connected to movement about these axes. Thus, when the leveling links are arranged as shown in Figure 2, the links extend generally downwardly and pivotally connect the leveling pivot members 71 and 72, and the plow beam and plow bottom connected therewith, to the tractor 2 for generally lateral swinging movement, under the control of a leveling lever 95 which is pivotally mounted on the bracket 85 and is provided with an arm 96 that extends rearwardly. The arm 96 is connected by a link 97 to an arm 98 that is fixed to the leveling link 77, as best shown in Figure 2. The leveling lever 95 includes detent mechanism 101 of usual construction, which cooperates with a ratchet section 102 which is carried by or formed on the upper portion of the bracket 85, as best shown in Figure 4. As will be seen from this figure, rocking the lever 95 in one direction or the other will act through the link 97 to swing the leveling link 77 about its pivotal support on the lower end of the bracket 85. This, in turn, swings the forward end of the plow beam 37 and the right-hand leveling link 78. A detailed description of the movements involved when the leveling lever 95 is actuated will appear below.

The links 77 and 78, and the brackets 85 and 90, together with the links 37 and 38 and associated parts, constitute hitch means connecting the plow bottom 20 with the tractor.

The brackets 85 and 90, which are fixed to the tractor quills 6 and 7 by the studs 17 and 18, serve to support a lifting rock shaft 110 that extends transversely of the tractor. A collar 111 (Figure 2) is fixed to the left end of the rock shaft 110 to prevent the latter from becoming displaced to the right relative to the left bracket 85, and the other end of the rock shaft 110 is squared to receive a crank member 112, one arm 113 of which is connected by a link 114 to a master lever 115 mounted for rocking movement about the rock shaft 110. The lever 115 carries detent mechanism 116 which cooperates with a ratchet section 116a formed on or carried by the bracket 90. The other arm 117 of the crank member 112 is formed to receive one end of a spring 118, the upper end of which is adjustably connected by means of a bolt 119 to an extension 90a formed on the bracket 90. As best shown in Figures 3 and 4, the lower extensions 87 and 93 of the brackets 85 and 90, are disposed downwardly below the upper pivots 82, which connect the swinging leveling links 77 and 78 with the brackets 85 and 90, a material distance and are formed with their forward edges substantially in a vertical plane. The forward links 79 bear against the extensions 87 and 93 during operation, thereby relieving the pivots of the draft load to a considerable extent.

Figure 5:
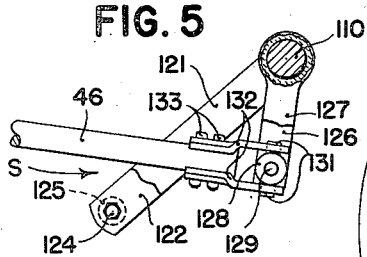
Figure 5 is a sectional view taken approximately along the line 5—5 of Figure 1, showing the connection between the adjusting rock shaft and the upper link which connects the plow bottom with the tractor.

As best shown in Figures 1 and 2, a pair of arms 121 and 122 are fixedly secured, as by welding, to the intermediate portion of the rock shaft 110. The outer ends of the arms 121 and 122 receive a transverse bolt 124 upon which a bushing 125 is mounted. A second and shorter pair of arms 126 and 127 are also securely fixed, as by welding, to the rock shaft 110. The latter arms are apertured at their outer ends to receive a pivot block 128 rockably connected to the arms 126 and 127 by a pivot bolt 129 or other suitable means. The pivot block 128 is provided with studs 131 which are engaged by a pair of upper and lower straps 132 bolted, as at 133, to the forward end of the rod 46, the latter being disposed above the bushing 125, as best shown in Figures 1, 3 and 5.

Figure 6:
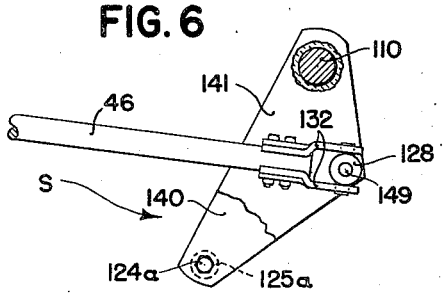
Figure 6 is a view, corresponding to Figure 5, showing a modified form of connection.

Figure 6 discloses a modified form of depth adjusting and lifting crank wherein a single set of arms 140 and 141, instead of two sets 121, 122 and 126, 127 (Figures 1 and 5), are employed. Referring now to Figure 6, the rock shaft 110 has welded or otherwise firmly fixed thereto the generally triangular plates that form the arms 140 and 141. These arms or plates are spaced apart laterally a distance somewhat less than the spacing between the arms 121 and 122 (Figure 1), but greater than the distance between the arms 126 and 127. The radially outermost ends of the arms 140 and 141 are apertured to receive a bolt 124a upon which a bushing 125a is disposed. The bushing 125a normally is disposed below the link or rod member 38. Underneath the rock shaft 110 the plates 140 and 141 are apertured to receive a bolt 149 upon which a pivot block is mounted. Since this pivot block and associated parts are identical with the pivot block 128 and associated parts described above, the corresponding reference numerals have been employed in Figure 6 as in the preceding figures. The pivot block 128 in Figure 6 receives pivot straps 132 which are bolted, as at 133, to the rod 46, as described above.

The operation of the implement described above is substantially as follows:

During normal operation, the plow bottom 20 and the standard 25 to which it is fixed, serve as one integral part which is pivotally connected for vertical floating movement to the tractor 2 by the link members 37 and 38, the link member 37 being in the form of a plow beam with a curved section 37a providing the necessary clearance above the moldboard. The lister bottom or plow bottom 20 is adjusted to have the proper suction by means of the lock nuts 48 and 49. By loosening one and tightening up on the other, the effective length of the upper link 38 is increased or decreased which throws the point 23 either upwardly or downwardly, respectively. To increase the suction the effective length of the link member 38 is shortened, and this causes the plow bottom 20 to run deeper into the ground before it reaches a stable position. The gauge wheel 60 runs on the bottom of the furrow opened by the plow bottom 20. To decrease the suction the effective length of the link 38 is increased, which raises the point 23 and, in effect, bears down on the gauge wheel 60 to raise the plow bottom 20 to a position of less suction. In operation, the depth of plowing is controlled by the master lever 115, which is connected through the link 114 with the rock shaft 110. Moving the lever 115 rearwardly rocks the shaft 110 in a direction to exert a pull on the link member 38, either through the arms 126 (Figure 5) or the forward portions of the arms 140 and 141 (Figure 6). Pulling the link member 38 forwardly has the effect of rocking the plow bottom 20 in a clockwise direction (Figure 3) which lowers the point and causes the plow bottom 20 to seek a stable position somewhat deeper in the ground. To decrease the depth of plowing, the hand lever 115 is rocked forwardly, which has the effect of thrusting the link member 38 rearwardly and lifting the plow point 23 about the gauge wheel 60 as a fulcrum. This causes the plow bottom 20 to seek a more shallow position of stability. Thus, briefly, the master lever 115 is so connected to tip the plow bottom in a fore and aft direction so as to cause the same to operate at a deeper or a more shallow plowing position.

During normal operation when the outfit is in the ground at work, there should be some space between the upper link or rod 46 and the bushing 125 or 125a. Such a space is indicated in Figures 3, 5 and 6 by the letter S. This is for the purpose of permitting the plowing unit to float relative to the tractor so that the plow bottom or other earth-working tool will not be affected when the tractor wheels pass over uneven ground. However, when it is desired to lift the unit into transport position, the hand lever 115 is thrown forwardly until the detent mechanism 116 (Figure 2) engages in a transport notch 116b (Figure 3). This movement of the master lever 115 first shifts the rod 46 rearwardly, which serves to raise the plow point 23 so that the plow itself tends to run out of the ground, thus facilitating raising the plow bottom. Continued forward movement of the hand lever 115 eventually causes the bushing 125 or 125a to engage the underside of the rod 46 and to lift the plow bottom 20 and the rear end of the lower link member or plow beam 47 upwardly, together with the gauge wheel 60 or other operating unit or mechanism that may be connected with the standard 25. Thus, one lever, namely, the master lever 115, serves both as a depth adjusting means and a lifting means, and the lock nuts 48 and 49 also serve as auxiliary depth adjusting means, since they may be used to change the effective length of the link member 38 in much the same manner as the position of the master lever 115 varies the effective length of the member 38. In Figure 3, the plow bottom 20 is shown in a position of minimum plowing depth, at which time the clearance space S is nevertheless sufficient to secure the desired extent of floating movement. During the forward travel of the outfit, all of the necessary draft is transmitted through the links 77 and 78. When lowering the plow bottom into operating position, the reverse action takes place. Rearward movement of the hand lever 115 not only lowers the bottom but also it pulls forward on the rod 46, thus tending to angle the point 23 downwardly which of course causes the plow bottom to seek its full plowing position as the implement moves forwardly.

When the implement is used the first time over the field, the lever 95 is adjusted to center the furrow opener 20, since the tractor 2 is operated level, as shown in Figure 2. Preferably, the tractor wheels 11 and 12 are spaced on the drive axles 8 and 9 so that on the next and subsequent rounds one drive wheel runs in the previously opened furrow while the other wheel runs on the land. This disposes the tractor 2 in a tilted position, as shown in Figure 7. However, for best operation, the plow bottom itself should operate in a level position, and in order to accomplish this result, the leveling links 77 and 78 are arranged as shown in Figures 2 and 7, namely, in a dependent but downwardly converging relation.

In order to permit leveling the plow bottom, when the tractor is operated in a tilted position, without causing any variation in the row spacing or the like, the leveling pivots 71 and 72 are arranged with the transverse sleeve sections 74 (Figures 3 and 4) disposed laterally inwardly adjacent the front ends of the plow beam members 43 and 44 (Figures 2 and 7). This disposes the leveling links 77 and 78 in a downwardly convergent relation such that, when the leveling links 77 and 78 are in their intermediate position (Figure 2), a line through the pivots of the leveling link 77 will intersect the line through the pivots of the other leveling link 78 substantially in the longitudinal line that extends rearwardly in the horizontal plane that contains plow point 23. Thus, movement of the leveling lever 95 in one direction or the other to swing the leveling link 77, causes the plow bottom 20 to shift laterally so that the point 23 remains substantially in the same central longitudinal line; that is, when the leveling links 77 and 78 are swung in one direction or the other, the plow bottom is given substantially a lateral rotary movement about the longitudinal axis that passes through the plow point 23. Thus, the plow bottom remains in the center of the tractor but is tilted or shifted laterally so as to operate in a level position, as illustrated in Figure 7. When the other wheel 12 operates in the furrow and the wheel 11 is on the land, the leveling lever 95 is swung rearwardly so as to tilt or shift the plow bottom in the other direction.

This type of swinging link hitch connection is applicable not only to a single bottom plow but also to two-row implements. In other words, the link arrangement 77, 78 is adapted to level the bottoms, whether one or a plurality are provided.

As mentioned above, Figure 7 shows the outfit operating with the left rear tractor wheel in the previously formed furrow and the lever 95 operated to level the plow bottom. The dotted lines, Figure 7, show the position of the plow body before leveling, that is, with the leveling links 77 and 78 in the same position relative to the tractor as is illustrated in Figure 2.

Figures 8 and 9 illustrate the laterally swinging links 77 and 78 in a different position. Referring for the moment to Figure 2, it will be noted that the lower pivot bolts 82 are disposed closely adjacent the forward divergent portions of the lower link or plow beam 37. This arrangement is secured by mounting the leveling pivots 71 and 72 with the cross sleeves 74 laterally inwardly toward the plow beam so that the leveling links 77 and 78 converge downwardly. If desired, the leveling pivots 71 and 72 may be reversed end for end on the laterally outer ends 68a and 68b of the cross shaft 68 so as to dispose the transverse sleeves 74 adjacent the laterally outer ends of the cross shaft 68. This is the arrangement shown in Figures 8 and 9, and from these figures it will be seen that when this is done the leveling links 77 and 78 are arranged in parallelism. Thus, with this arrangement of the parts, operation of the leveling lever 95 serves to shift the plow bottom 20 bodily laterally but not with a rocking action about a longitudinal axis that passes through the plow point as in Figures 2 and 7. In other words, both arrangements provide for a lateral movement of the plow bottom, but in Figures 2 and 7, the lateral movement is in the nature of a tilting movement about a longitudinal axis that coincides with the plow point, while in Figures 8 and 9 the shifting movement is in the nature of a lateral movement of the plow bottom in which all points move in substantially parallel directions.

The two arrangements, namely, Figures 2 and 7 and Figures 8 and 9, are used under different circumstances. When the rows or furrows are to be spaced apart a considerable distance, for example, approximately half the tread of the tractor when the wheels are at their widest spacing, as in Figures 2 and 7, the links 77 and 78 may be arranged as shown in these figures whereby, when going over the land for the first time, the tractor is operated with first one rear wheel in the furrow and then the other wheel in the furrow, leveling the plow bottom each time the outfit is turned around at the end of the field. Figure 2 shows the outfit when opening the first furrow and Figure 7 shows the outfit arranged to form the subsequent furrows. It will be noted from Figure 7 that the plow bottom 20 operates in a level or vertical position. Hence, if desired, planting may be done at the same time the furrows are formed, especially if a planting unit is fixed directly to the plow standard so that it, too, is leveled when the plow bottom is leveled. I have described below a planting attachment of this type. If a more narrow spacing is desired, the rear wheels of the tractor may be placed farther in on the axle shafts 8 and 9 and the operation continued as illustrated in Figures 2 and 7. However, with the wheels in their more narrow setting, the extent of tilting of the tractor is, of course, increased. In some cases this is not desirable, especially where planting attachments are used in which the seed selecting mechanism is carried directly on the tractor, an attachment of this kind also being illustrated and described below. It may therefore be desirable to operate the tractor, not tilted as shown in Figure 7, but entirely on the unplowed land in a level position. If that is the case, the links 77, 78 may then be arranged as shown in Figures 8 and 9, namely, in parallel relation. Then, both rear wheels may be disposed on the unplowed ground and the leveling lever 95 swung in one direction or the other to dispose the plow bottom 20 a desired distance from the furrow last formed. This is illustrated in Figure 9 in which the furrow formed on the previous round is indicated by the letter F. When operating in this fashion it is especially desirable to have the rear tractor wheels disposed at their narrowest setting in order that the furrowward tractor wheel operate on the unplowed ground with no tendency to break down the landward furrow wall. In Figure 9 it will thus be noted that the tractor operates in a level position with both rear wheels on the unplowed ground. Figure 9 shows forming one furrow, and when the next furrow is to be formed the outfit is turned around at the end of the field and the lever 95 swung in the other direction so as to dispose the plow body 20 close to the other tractor wheel 12, which then operates close to the newly formed furrow in substantially the same relation illustrated for the tractor wheel 11 in Figure 9.

In other cases, especially where the tractor wheels are arranged at their widest spacing, it may not be considered undesirable to operate the plow bottom also in a slightly tilted relation. In that event, the links 77 and 78 may be arranged as shown in Figures 8 and 9 but the tractor operated in the manner shown in Figures 2 and 7, namely, with one or the other of the tractor wheels in the last formed furrow. In that event, the row spacing may be varied by operating the leveling lever 95 so as to bring the plow bot'om closer or farther away from the furrow tractor wheel. In other words, operated in this manner, the furrow spacing may be greater than or less than one-half the tread spacing of the tractor.

When it is desired to split out old ridges or beds, previously formed as by a prior blank listing operation, the tractor wheels 11 and 12 may be moved in to a narrow spacing so that one drive wheel can be located in the furrow at one side of the ridge to be split and the other drive wheel in the furrow at the other side, placing the front wheels of the tractor on top of the ridge or bed to be split. When performing this operation, the leveling links 77 and 78 may be disposed either as shown in Figures 2 and 7 or as in Figures 8 and 9. In this operation, the outfit is driven down the row, skipping every other ridge and leaving an unbroken ridge or bed between each one that has been worked. When the entire field has been covered in this manner, the tractor wheels can then be changed to the wide position and the remaining ridges can then be split out. By this method, the tractor wheels will not run over any part of the newly formed beds.

Reference was made above to planting attachments particularly adapted for the implement described above. Referring now more particularly to Figure 10, the planting attachment is indicated in its entirety by the reference numeral 150 and comprises a runner frame 151, seed selecting mechanism 152 and driving means 153 therefor. A planting unit of this kind may be fixed to the standard 25 (Figure 3) in lieu of the gauge wheel 60 and associated parts, using a lister plow bottom 20 for the purpose of planting the crop when the ground is listed the first time. However, it is also possible to plant on the top of the ridges or beds following a previous blank listing operation, and in this event it is the practice to substitute a planter sweep for the lister bottom 20, arranging the planting attachment behind the sweep, as shown in Figure 10. In this figure, the lister bottom 20 (Figure 3) has been replaced by a planter sweep 20a which is fixed to the standard 25 by a bolt 156, and the gauge wheel 60 and associated parts have been replaced by a gauge shoe 60a which is attached to the lower portion of the standard by the same bolt 156 which secures the plow sweep 20a in place. This provides the desired space to receive the planting unit.

The runner frame 151 of the planter comprises two bars 158 and 159 which are bolted, as at 161, to the standard 25, just below the pivot bolt 33, and the rear ends of the bars 158 and 159 are connected by a cross bar 162 which extends laterally outwardly beyond the bars 158 and 159 alongside the ends 158a and 159a thereof which are bent laterally outwardly. This forms a convenient support for covering shovels 164 and 165 and their supporting standards 166 and 167. Clamps 168 and 169 preferably are used for securing the standards 166 and 167 in place. The front ends of the runner frame bars 158 and 159 are braced by bars 171 and 172, the upper ends of which are apertured to receive the clamping bolts 34. The lower ends of the bracing members 171 and 172 are apertured to receive a pair of bolts 173 and 174, the latter bolt connects to the frame bars 158 and 159, and both bolts serve to connect a planter runner 176, the latter having a seed boot 177 provided with apertured sections to receive the bolts 173 and 174 by which the runner 176 is rigidly fastened to the frame 151.

The seed selecting mechanism 152 includes a seed can 181 which, with the seed plate and other operating parts, is carried at the upper end of a frame casting 182. The latter is provided with a pair of slots 183 and 184 through which a pair of bolts 185 pass. By loosening the bolts 185 the frame casting 182 may be adjusted on the frame 151. The frame bars 158 and 159 are apertured to receive the bolts 185, and when the latter are tightened the frame casting 182 is rigidly secured to the runner frame 151. The seed selecting mechanism includes a seed spout 186 which is associated telescopically with the runner boot 177, whereby to accommodate the aforesaid adjustment of the frame casting 182 and associated parts relative to the runner frame 151.

The frame casting 182 includes a vertically disposed sleeve section 188 in which a drive shaft (not shown) is journaled. The upper end of the drive shaft is connected to a driving bevel gear 189 which meshes with a driven gear 190 on the seeding shaft, the latter having connected thereto the bevel pinion 191 which drives the seed plate, as in conventional practice. The lower end of the shaft that is disposed in the vertical sleeve section 188 is connected by means of a pair of bevel gears (not shown) to a cross shaft 193 upon the ends of which driving star wheels 194 and 195 are fixed. The wheels 194 and 195 engage the ground back of the planter runner 176 and rotate the driving bevel gear 189 to drive the seed selecting mechanism, as will be readily understood.

From the above description it will be seen that the planting unit 150 is rigidly fixed to the standard so as to be adjustable with the latter and the plow body as a unit. That is, when the tractor is operated in a tilted position and the lister is adjusted to run level, any planting unit secured to the standard is therefore operated in a level position. Also, when the plow bottom is adjusted to operate at different depths, the planting attachment 150 is adjusted therewith without requiring additional attention on the part of the operator, since the planting unit always operates at the desired position relative to the plow body. As shown in Figure 10, the front ends of the bars 158 and 159 are slotted to receive the bolt 161, the slots being shown at 197. This permits an initial adjustment of the planting unit relative to the standard 25. Also, as mentioned above, the seed can and associated parts can also be raised or lowered by loosening the bolts 185 and shifting the frame 182 to a different position. As also mentioned above, the gauge shoe 60a is used in place of a gauge wheel (see Figure 3) when a planting unit is employed. However, it will be observed that when the master lever 115, or the adjusting nuts 48 and 49 are adjusted, the gauge shoe 60a, like the gauge wheel 60, moves with the standard and when the parts are adjusted for more shallow operation, the rear end of the gauge shoe bears down on the furrow bottom and aids in causing the plow bottom to move up to a more shallow plowing position.

The planting unit 150 described above is in the nature of an integral unit, that is, the seed can, the seed selecting mechanism and the driving means are all supported as a unit on the standard 25, in addition to the planter runner 176 which is fixed to the planter frame 151. In some cases it may be desirable to support the seed can and seed selecting mechanism on the tractor independently of the furrow opener, thereby relieving the lifting and lowering means of the weight of the seed and seed selecting means. Preferably, also, in such a unit the drive is taken from one of the tractor wheels, rather than from an additional wheel. An attachment of this kind embodying the principles of the present invention is shown in Figure 11 which will now be described.

A tractor shown in Figure 11, indicated by the reference numeral 2a, differs from the tractor shown in Figures 1 and 2 in that the rear wheels are not laterally adjustable and the tractor is adapted to always operate parallel to the land surface, that is, with both rear wheels in the furrows or both on the land. The tractor 2a is provided with a rear axle housing 201 having axle shafts extending laterally thereof and receiving the rear tractor wheels 202. The axle housing 201 is formed to receive longitudinal frame pipes 204 and 205, and brackets 206 and 207 are mounted in any suitable manner on the rear ends of the frame pipes 204 and 205. Preferably, the brackets 206 and 207 are formed of plate stock, each bracket having a depending portion 209 and a horizontal attaching portion or flange 210 which is bolted, as at 211, to the associated frame pipe. Each of the brackets 206 and 207 carries a lug 213 which is apertured to receive a rock shaft 216.

The brackets 206 and 207 and the rock shaft 216 are adapted to receive an implement similar to that shown in Figures 1 to 9. In fact, many parts are preferably but not necessarily identical, and therefore in the succeeding description those parts that are identical with those described above are identified by the same reference numerals.

The lower portions 209 of the bracket extend forwardly and receive the forward spaced apart portions 41 and 42 of a plow beam 37, which serves as a link member in the same way and is of substantially the same construction as the member 37 described above in connection with Figures 1 to 10. In the implement shown in Figure 11, however, the cross shaft 68 has been omitted and the ends 41 and 42 of the plow beam members 43 and 44 are directly connected, by pivot pins or otherwise, to the lower end portions 209 of the brackets 206 and 207.

In Figure 11, the standard, indicated at 25a, is of one-piece construction and includes bars 27b and 28b that extend downwardly from the trunnion 51 to the tool receiving section of the standard to which a sweep, preferably identical with the sweep 20a shown in Figure 10, is bolted, as at 156. In other words, the trip plates 31 and 32 (Figures 3 and 10) have been omitted and the runner frame 151 secured directly to the lower ends of the bars 27a and 28a. The runner frame 151a is of the same construction shown in Figure 10, and hence further description is unnecessary.

The planting unit shown in Figure 11 is indicated in its entirety by the reference numeral 220 and includes a seed can 221 supported on a planter frame 222 which consists of two sets of side bars 223, 224 connected together at their rear ends by a cross angle 225. The front ends of the bars 223 and 224 are bolted to the rear ends of the frame pipes 204 and 205. The seed can 221 is supported on a frame that carries the seed selecting mechanism, indicated in its entirety by the reference numeral 228. This mechanism includes a seeding shaft 231 on the end of which a sprocket gear 232 is fixed. The gear 232 is driven by a sprocket chain 235 which is trained around and driven by a sprocket gear (not shown) fixed to rotate with the left-hand tractor wheel 202.

The seed selecting mechanism discharges through a spout 237 into a flexible seed tube 238 which directs the seed into the seed boot 177a of a planter runner 176a, substantially of the same construction and fixed to a planter frame 151a in substantially the same manner as the construction shown in Figure 10.

The rock shaft 216, which corresponds to the rock shaft 110 shown in Figure 1, is supported for rocking movement on the lugs 213. At the intermediate portion the rock shaft 216 has welded thereto a pair of closely spaced plates 240 and 241 between which the upper link member 38 is disposed. The forward end of the rod 46 which makes up the upper link member 38 is pivoted directly to a pivot bolt 243 that is carried by the plates 240 and 241. The rear ends of the plates 240 and 241 are spaced apart to receive a bushing (not shown) mounted on a bolt which is disposed in about the same position as the bolt and bushing construction 124a, 125a (Figure 6). The rock shaft 216 is formed with and carries an arm 250 to which the rear end of a link 251 is connected. The link 251 extends forwardly of the tractor and is connected by suitable means to a depth adjusting lever (not shown).

The operation of the implement shown in Figure 11 is substantially the same as the implement shown in the other figures. The depth adjusting lever that rocks the rock shaft 216, operates through one range of movement for exerting a thrust or a pull on the link 38 to control the depth of operation, and movement of the rock shaft 216 through another range of movement causes the arms 240 and 241 to swing up and carry the bolt and bushing means into engagement with the link 38, thereby lifting the unit into a transport position. During this operation, it will be observed that it is not necessary to lift the seed can and seed selecting mechanism, since the latter are supported by the frame 223, 224, 225 directly on the tractor, the only weight added to the implement by the planting attachment being the furrow opener 176 and associated parts. The plates 240 and 241 are spaced close to the upper link 38, since in this form of the invention the furrow opener 20a does not shift laterally. However, in the forms of the invention shown in Figures 1 to 9, the arms 121, 122 (Figures 1–5) and 140, 141 (Figure 6) are spaced apart to accommodate lateral swinging of the upper link 38, as indicated in Figures 7 and 9.

Figure 12:
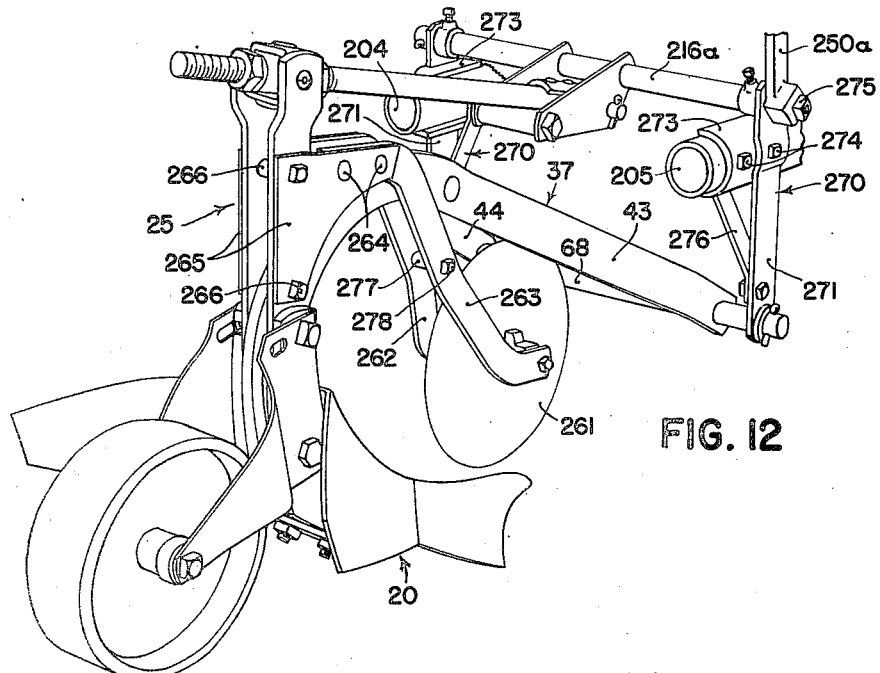
Figure 12 is a view similar to Figure 11 and illustrates the manner of attaching a coulter to the furrow opener standard and the manner in which the lower link, or beam, accommodates the counter.
Figure 13:
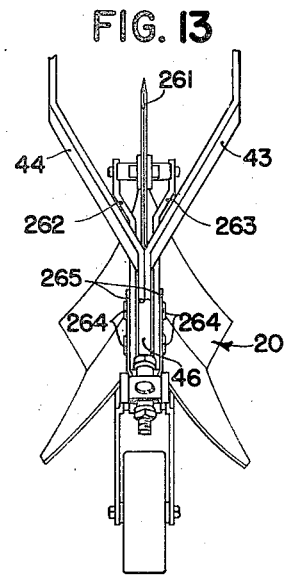
Figure 13 is a plan view of the coulter and beam arrangement shown in Figure 12.

Reference was made above to the fact that the planting means shown in Figure 10 is only one type of operating part or mechanism that, when desired, may be connected to the furrow opener standard for movement therewith. Referring now to Figures 12 and 13, a coulter 261 is mounted for rotation on the lower ends of two arms 262 and 263 which are disposed in generally parallel vertical planes longitudinal length of the outfit. The upper ends of the arms 262 and 263 are curved and are fixed, as by bolts 264, to a pair of plates 265 which are, in turn, bolted or otherwise secured, as at 266, to the standard 25. As best shown in Figure 12, it will be noted that the arms 262 and 263 are so formed that they can be attached to the rear portion of the beam 37 and, extending downwardly and forwardly, support the coulter 261 in the central longitudinal vertical plane of the outfit and in a position generally between the forward divergent portions of the two beam members 43 and 44. As will be readily understood, any other tool or means that it is desired to mount forward of the furrow opener 20, or in the central portion of the implement, may be carried by the arms 262 and 263 or their equivalent. If desired or necessary, the cross shaft 68, to which the forward ends of the beam members 43 and 44 are fixed, may be eliminated if necessary to accommodate the coulter 261 or other part, and the ends of the members 43 and 44 connected by pivots to the lower ends of a pair of brackets 270 on the tractor, in the same manner described above in connection with Figure 11.

The beam 37 shown in Figure 12, is attached to the rear frame members 204 and 205 of the tractor by brackets which are slightly different from the brackets shown in Figure 11. Functionally, however, they are substantially the same. The brackets 206 and 207 of Figure 11 dispose the hitch point for the beam 37 farther forward than the brackets 270 in Figure 12. Referring now more particularly to this latter figure, each of the brackets 270 comprises a vertical strap 271 apertured at its lower end to receive the associated end of the plow beam cross shaft 68 on the pivot, and at its upper end each strap member 271 is welded or otherwise secured to a generally U- shaped member 273 which embraces the associated frame pipe, 204 or 205, and is adapted to be bolted or otherwise secured thereto, as indicated at 274. The uppermost end of each of the strap members 271 is apertured to receive a rock shaft 216a which serves both as depth adjusting means and as raising and lowering means. The rock shaft 216a is substantially identical with the rock shaft 216 described above, except that the arm 250a is not an integral part thereof as shown in Figure 11, but is separate therefrom and fixed thereto, as by a nut 275. Figure 13 illustrates the way in which the coulter supporting arms 262 and 263 pass under the divergent sections of the plow beam 37 so as to dispose the coulter in the proper operating position therebetween. A brace 276 is connected at its lower end to the lower end of the bracket 271 and at its upper end is secured to the side of the associated tractor frame pipe opposite the upper end of the bracket 271. The two arms 262 and 263 are reenforced by a spacing sleeve or bushing 277 secured in position by a bolt 278 or the like.

Figure 14:
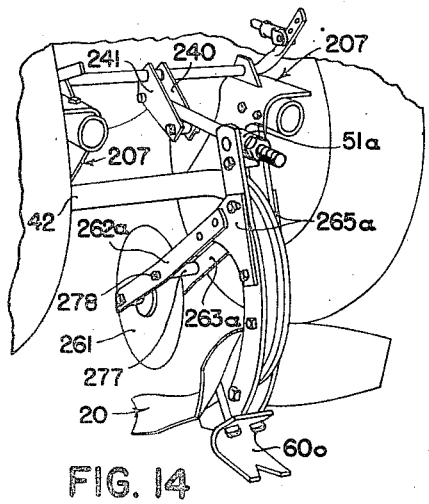
Figure 14 is a modified form of coulter support.

The construction shown in Figure 14 is quite similar to that shown in Figure 12 except that the coulter 261 is carried by arms 262a and 263a which are substantially straight, instead of being curved as shown in Figure 12. The upper or rear ends of the arms 262a and 263a are fixed to plates 265a in substantially the same manner as in Figure 12. In Figure 14, I have shown the same brackets 207 as are shown in Figure 11 and described above. If desired or necessary, the coulter 261 may be carried by the furrow opener standard 25 in addition to the planting means shown in Figures 10 and 11, or their equivalent.

In the above description and in the claims below I have used such terms as plow bottom and furrow opener in a broad sense as representative of any form of tool means.

While I have shown and described above the preferred structure in which the principles of the present invention have been embodied, it is to be understood that my invention is not to be limited to the specific means shown and described above, but that, in fact, widely different means may be employed in the practice of the broader aspects of my invention.

What I claim and desire to secure by Letters Patent is:

1. An agricultural implement comprising supporting means, tool means, a pair of vertically spaced generally longitudinally extending links connecting said tool means with said supporting means, and common means connected with one of said links for shifting the same generally longitudinally and with said one link for swinging the link generally vertically to adjust said tool means relative to the supporting means.

2. An agricultural implement comprising a supporting frame, a lever pivoted thereon for movement about a transverse axis, tool means, a pair of vertically spaced, generally longitudinally extending links pivotally connected with said tool means, means pivotally connecting the forward end of one of said links with the supporting frame for both lateral and vertical movement relative thereto, means pivotally connecting the other link with said lever, whereby movement of the latter about its axis serves to pivot the tool means about its point of connection with said one link, said lever and said other link being constructed to accommodate lateral movement of the latter relative to the supporting frame when said one link shifts laterally relative to said supporting frame, and means on said lever engageable with said other link at a point spaced from its pivot connection with said lever, whereby swinging movement of the latter acts through said second link for raising said tool means relative to said supporting frame.

3. An agricultural implement comprising a supporting frame, tool means, a pair of links pivotally connected at their rear ends to said tool means, said links extending generally longitudinally of said supporting frame, means connecting the forward end of one of said links with said supporting frame, comprising a pair of laterally swingable links pivotally connected to said supporting frame for swinging movement in a generally transverse direction and means at the lower ends of said laterally swinging links for pivotally receiving said one link and accommodating generally vertical swinging movement of the latter relative thereto, and means pivotally connecting the forward end of the other of said first mentioned links with said supporting frame and accommodating lateral movement of said other link relative to said supporting frame.

4. An agricultural implement as defined in claim 3, further characterized by means connected with at least one of said laterally swingable links for shifting said tool means laterally.

5. An agricultural implement as defined in claim 3, further characterized by means connected with one of said laterally swingable links for shifting said tool means laterally relative to the supporting frame, and means connected with one of said generally longitudinally extending links for shifting said tool means generally vertically relative to the supporting frame.

6. A tractor implement comprising tool means, a standard to which said tool means is rigidly fixed, an upwardly curved beam pivotally connected at its rear end to said standard and at its forward end to the tractor, a link member pivotally connected at its rear end to the upper end of said standard, swingable means on the tractor to which the forward end of said link member is pivoted, swinging movement of said swingable means serving to adjust said tool means and standard about their point of pivotal connection to the rear end of said beam, and an extension on said swingable means engageable with said link member whereby movement of said swingable means carries said extension into contact with said link member and is adapted to raise said tool means relative to the tractor.

7. A tractor mounted implement comprising a plow bottom, means serving as a pair of generally longitudinally extending link members pivotally connected at their rear ends with said plow bottom, a pair of brackets adapted to be fixed to the tractor in laterally spaced relation, a rock shaft journaled for rocking movement on said brackets, an arm fixed to said rock shaft, means pivotally connecting the forward end of the upper link member to said arm for both lateral and generally vertical swinging movement, the axis of vertical swinging movement of said upper link member relative to said arm being disposed below the axis of said rock shaft, a lever fixed to the latter for rocking the same from one position to the other to adjust the depth of operation of the plow bottom, means pivotally connecting the forward end of said lower link member with the tractor for lateral movement relative thereto, means for shifting said plow bottom and link means laterally, and a lifting member carried by said arm and engageable with said upper link member rearwardly of its pivotal connection with said arm, said lifting member being formed to engage said upper link member in any lateral position thereof, whereby movement of said lever and rock shaft through one range serves to adjust the plow bottom for different operating depths and movement of said lever and rock shaft beyond said range acts through said upper link member to raise the plow bottom in any lateral position of the latter.

8. An agricultural implement comprising a supporting means, tool means including a furrow opener and a standard to which said furrow opener is fixed, a pair of vertically spaced generally longitudinally extending links connected with said standard, means movably connecting one of said links with said supporting means, depth adjusting means connected with the other of said links for swinging said standard to adjust the operating depth of said furrow opener, said tool means also including an operating unit, means for moving said standard generally laterally, and means rigidly connecting said unit to said standard at a point adjacent the furrow opener, whereby when said standard is moved generally laterally, both said operating unit and said furrow opener are moved in the same direction relative to said supporting means.

9. A tractor-mounted implement comprising a tractor, a pair of brackets fixed thereto in laterally spaced relation, a beam member including forward divergent sections pivotally connected, respectively, with said brackets, a standard pivoted to the rear end of said beam member, a furrow opener fixed rigidly to the lower end of said standard, a rock shaft supported for rocking movement on the tractor, means for rocking said rock shaft, an arm carried by said rock shaft, a link member pivotally connected at its rear end to the upper end of said standard and at its forward end to said arm, whereby rocking movement of said rock shaft acts through said link and standard for adjusting the operating depth of said furrow opener, and a planting unit carried by said standard and including a runner frame fixedly secured to said standard, a planter furrow opener fixed to said runner frame, a seed selecting and depositing mechanism carried by said runner frame and vertically adjustable relative thereto and relative to said planter furrow opener, and ground engaging means associated with said mechanism for driving the same, rocking movement of said rock shaft serving to swing said standard and the planting unit about the point of pivotal connection between said standard and said lower link so as to maintain said planter furrow opener and said ground engaging means in substantially constant relation with respect to said first furrow opener for different operating depths of the latter.

10. A tractor-mounted implement comprising a tractor, a pair of brackets fixed thereto in laterally spaced relation, a beam member, including forward divergent sections pivotally connected, respectively, with said brackets, a standard pivoted to the rear end of said beam member, a furrow opener fixed rigidly to the lower end of said standard, a rock shaft supported for rocking movement on the tractor, means for rocking said rock shaft, an arm carried by said rock shaft, a link member pivotally connected at its rear end to the upper end of said standard and at its forward end to said arm, whereby rocking movement of said rock shaft acts through said link and standard for adjusting the operating depth of said furrow opener, a seed receiving furrow opener disposed rearwardly of said first mentioned furrow opener, means rigidly securing said seed receiving furrow opener to said standard, whereby both of said furrow openers are adjusted by said rock shaft simultaneously, seed selecting mechanism, means supporting the same rigidly on the tractor, and means for delivering seed therefrom to said second furrow opener, said link and beam members serving to maintain said two furrow openers in substantially the same relative vertical position when operating at different depths.

11. An agricultural implement comprising a supporting frame, a furrow opener, a plow beam pivotally connecting the furrow opener with said supporting frame, a ground engaging wheel swingably connected with said beam, arm means serving to swing said ground engaging wheel, and means including a lever pivotally mounted on said supporting frame, said lever having one part connected with said arm means and adapted through one range of movement of the lever to swing said ground engaging wheel relative to said beam, and means connecting another part of said lever with said wheel and beam and operative through another range of movement of the lever for lifting both said beam and said ground engaging wheel into transport position.

12. A tractor-mounted implement comprising a plow beam, means pivotally connecting the same with the tractor, a plow bottom pivoted to said beam, a link member pivotally connected at one end with said plow bottom for swinging the same relative to said plow beam to vary the depth of operation, an adjusting lever pivoted on the tractor, means serving as an arm fixed to swing with said lever, means pivotally connecting the forward end of said link member with said arm whereby the latter normally makes an angle of approximately 90 degrees relative to said link and swinging movement of said lever acts through said link to pivot said plow bottom with respect to said plow beam, and a part carried by said arm and engageable with said link after said plow bottom has been adjusted for minimum depth of plowing, whereby further movement of said lever acts through said link to raise said plow bottom and said plow beam relative to the tractor.

13. An agricultural machine comprising supporting frame means, tool means, a pair of links connected with one of said means for swinging movement relative thereto, and a pair of reversible sleeves operatively connecting said links with the other of said means, said sleeves in one position disposing said links in a convergent relation and in the other position disposing said links in substantially parallel relation.

14. An agricultural implement comprising, in combination, a supporting frame, a pair of links, each pivotally connected at its upper end to said frame for swinging movement relative thereto, operating tool means, and means pivotally connecting the other end of each of said links with said tool, whereby the latter is adapted to swing with said links relative to the supporting frame about an axis that extends generally longitudinally and substantially centrally of said tool means, said connecting means comprising a pair of reversible sleeves to which said links are pivotally connected, said sleeves in one position disposing said links in a convergent relation and in the other position disposing said links in substantially parallel relation.

15. An agricultural machine comprising supporting means, tool means, a pair of vertically spaced generally longitudinally extending links connected with said tool means, means connecting one of said links with said supporting means for both lateral and vertical swinging movement, and means including a pair of generally vertically extending laterally swingable links connecting the other of said first pair of links with said supporting means also for both lateral and vertical swinging movement.

16. An agricultural implement comprising means serving as a supporting frame, a plow bottom, a beam extending upwardly and forwardly and then downwardly and forwardly from the plow bottom for connecting the latter with said supporting frame means, a standard to which the plow bottom is fixed, and a link connecting said standard with said frame means.

17. An agricultural machine comprising supporting means, a pair of brackets fixed thereto in laterally spaced relation, a beam including forward divergent sections pivotally connected, respectively, with said brackets, a standard pivoted to the beam member rearwardly of said divergent sections, tool means carried by said standard, an operating part adapted to be positioned forwardly of said tool means, and means serving as arms fixed at their rear ends to said standard and supporting said operating part at their forward ends in a position in a vertical plane that extends generally between the forward divergent sections of said beam member.

18. A tractor mounted implement comprising a pair of brackets adapted to be fixed to the tractor in laterally spaced relation, means serving as a beam member including forward divergent sections pivotally connected, respectively, with said brackets, said sections being fixed together at their rear portions, a standard pivoted to said connected rear portions, a ground working tool fixed rigidly to the lower end of said standard, a coulter disposed forwardly and substantially in the vertical longitudinal central plane of said tool and approximately between said forward divergent beam sections, and a pair of arms rigidly fixed at their rear ends to said standard, said arms extending forwardly underneath said divergent sections of the beam member and rotatably receiving said coulter, and means connected with the upper end of said standard for rocking both said tool and said coulter relative to said beam member.

19. An agricultural implement comprising a supporting frame, a lever pivoted thereon for movement about a transverse axis, tool means, a pair of vertically spaced, generally longitudinally extending links pivotally connected with said tool means, means pivotally connecting the forward end of one of said links with the supporting frame for vertical movement relative thereto, means pivotally connecting the other link with said lever, whereby movement of the latter about its axis serves to pivot the tool means about its point of connection with said one link, and means on said lever engageable with said other link at a point spaced from its pivot connection with said lever, whereby swinging movement of the latter acts through said second link for raising said tool means relative to said supporting frame.

20. An agricultural machine comprising supporting means, tool means, a pair of generally longitudinally extending links connected with said tool means, means connecting one of said links for lateral swinging movement with said supporting means, and a pair of generally vertically disposed laterally spaced links swingably connected at their upper ends with said supporting means and swingably connected at their lower ends with the other of said longitudinal links.

21. An agricultural machine comprising frame means, tool means, a lower link connected at its rear end with said tool means, laterally swingable means connecting the forward end of said lower link with said frame means for lateral movement relative thereto, an upper link connected at its rear end with said tool means, a rock shaft on said frame means, means connecting the front end of said upper link with said rock shaft for lateral pivotal movement, and means on said rock shaft and operatively connected with one of said links for raising said tool means by rocking movement of said rock shaft.

22. An agricultural implement comprising supporting means, a ground engaging member having a generally vertically extending standard, a pair of vertically spaced generally longitudinally extending links connecting said standard with said supporting means for generally vertical movement, the lower of said links comprising forwardly divergent sections pivoted at their forward ends to said supporting means at laterally spaced points and pivoted at their rear ends to the lower part of said standard, a pair of arms fixed at their ends to said standard above said lower link and disposed outwardly of the rear ends of said divergent link sections, the forward ends of said arms extending downwardly under the forward diverging portions of said sections, and ground contacting means connected with the forward ends of said arms.

23. A tractor-mounted implement comprising a plow beam, means pivotally connecting the same with the tractor, a plow bottom pivoted to said beam, a link member pivotally connected at one end with said plow bottom for swinging the same relative to said plow beam to raise or lower the point of the plow bottom, a raising member pivoted on the tractor, means serving as an arm fixed to swing with said raising member, means pivotally connecting the forward end of said link member with said arm whereby swinging movement of said raising member in the raising direction acts through said arm and link to tilt the plow point upwardly and swinging movement of the raising member in the lowering direction acts through said arm and link to tilt the plow point downwardly, thereby tending to cause the plow bottom to run out of or deeper into the ground relatively quickly, and a part carried by said arm and engageable with said link after the plow point has been tilted upwardly whereby further movement of said swinging member acts through said link to raise said plow bottom and said plow beam relative to the tractor.

24. An agricultural machine comprising supporting means, tool means, a pair of vertically spaced generally longitudinally extending links connected with said tool means, means connecting one of said links with said supporting means for both lateral and vertical swinging movement, a cross bar to which the other of said links is connected for generally vertical movement, and means including a pair of generally laterally swingable links connecting said cross bar with said supporting means for generally lateral swinging movement.

25. In combination, a tractor having spaced rear wheels, one of which is arranged to run in a plowed furrow, a plow beam with a plow thereon, means for swingably supporting the beam on the tractor for adjustment to laterally disposed positions with respect to a neutral position and said means including downwardly converging swingable links whereby upon lateral adjustment of the beam and plow to a laterally disposed position the plow will be automatically leveled with respect to the particular wheel running in the plowed furrow, and means for adjustably swinging the beam and links to a laterally disposed position.

26. In combination, a small tractor having laterally adjustable rear wheels adapted to be arranged for narrow and wide settings, a plow beam with a middle buster plow therefor, means for supporting the plow beam on the tractor for lateral adjustment with respect thereto into positions to one side or to the other side of a neutral position, said supporting means including a plow beam supporting member and generally upright supporting links therefor pivotally connected with the tractor at laterally spaced points and pivotally connected with said supporting member at points spaced laterally of the tractor, said connection points being variable in lateral spacing from a coordinated relation wherein said links are non-parallel to provide for automatic leveling adjustment upon laterally adjusting the plow beam to a side position with the wheels in the wide setting and one of the same running in a furrow to a coordinated relation of said connection points wherein said links are relatively parallel to render the beam free of leveling adjustment upon its lateral adjustment to a side position with the wheels in the narrow setting and both wheels running on unplowed land, whereby provision is made for effecting plowing of the customary spaced furrows of a large size tractor with a tractor of small size.

27. An agricultural implement comprising a supporting means, tool means including a furrow opener and a standard to which said furrow opener is fixed, a pair of vertically spaced generally longitudinally extending links connected with said standard, means movably connecting one of said links with said supporting means, pivotally supported depth adjusting means mounted on said supporting means and connected with the other of said links and operable to shift the latter generally longitudinally for swinging said standard to adjust the operating depth of said furrow opener, and means on said adjusting means for engaging said other link at a certain point in the range of movement thereof, causing the link to swing rigidly therewith about a transverse axis adjacent the forward end of said link for raising said standard and furrow opener to a transport position.

WALTER H. SILVER.